United States Patent [19]
Ohara

[11] Patent Number: 5,894,430
[45] Date of Patent: Apr. 13, 1999

[54] ORTHOGONAL TRANSFORM PROCESSOR

[75] Inventor: Kazutake Ohara, Osaka, Japan

[73] Assignee: Matsushita Electric Industrial Co., Ltd., Osaka, Japan

[21] Appl. No.: 08/859,785

[22] Filed: May 19, 1997

[30] Foreign Application Priority Data

May 20, 1996 [JP] Japan ................... 8-124289
May 23, 1996 [JP] Japan ................... 8-128121

[51] Int. Cl.$^6$ ................................................ G06F 17/14
[52] U.S. Cl. ...................... 364/725.03; 364/725.02
[58] Field of Search ........................ 364/725.03, 725.02

[56] References Cited

U.S. PATENT DOCUMENTS

| | | | |
|---|---|---|---|
| 4,791,598 | 12/1988 | Liou et al. | 364/725 |
| 5,117,381 | 5/1992 | Juri et al. | 364/725 |
| 5,654,910 | 8/1997 | Iwata | 364/725.03 |
| 5,703,799 | 12/1997 | Ohta | 364/725.03 |

FOREIGN PATENT DOCUMENTS 3-35353  2/1991  Japan.

*Primary Examiner*—Tan V. Mai
*Attorney, Agent, or Firm*—McDermott, Will & Emery

[57] ABSTRACT

A two-dimensional discrete cosine transform processor (two-dimensional DCT processor) includes two one-dimensional DCT circuits and a transposition memory interposed therebetween. Each of the two one-dimensional DCT circuits includes a butterfly operation circuit and a distributed arithmetic circuit at the subsequent level. Partial sums of vector inner products based on a constant matrix obtained by multiplying respective elements of a discrete cosine matrix by frequency-depending weighting according to human visual sense are stored in ROMs included in the distributed arithmetic circuit, and the contents of the ROMs are used to obtain a one-dimensional DCT result with weighting given. In this manner, arbitrary weighting can be given to the transform result without using a multiplier. Thus, for example, in a compressing and coding system for image data, the compression efficiency can be improved as compared with the case where weighting is not given to the transform result.

6 Claims, 16 Drawing Sheets

$$\begin{bmatrix} Y0' \\ Y1' \\ Y2' \\ Y3' \\ Y4' \\ Y5' \\ Y6' \\ Y7' \end{bmatrix} = \begin{bmatrix} W0Y0 \\ W1Y1 \\ W2Y2 \\ W3Y3 \\ W4Y4 \\ W5Y5 \\ W6Y6 \\ W7Y7 \end{bmatrix} = \frac{1}{2} \underbrace{\begin{bmatrix} W0C4 & W0C4 & W0C4 & W0C4 & 0 & 0 & 0 & 0 \\ 0 & 0 & 0 & 0 & W1C1 & W1C3 & W1C5 & W1C7 \\ W2C2 & W2C6 & -W2C6 & -W2C2 & 0 & 0 & 0 & 0 \\ 0 & 0 & 0 & 0 & W3C3 & -W3C7 & -W3C1 & -W3C5 \\ W4C4 & -W4C4 & -W4C4 & W4C4 & 0 & 0 & 0 & 0 \\ 0 & 0 & 0 & 0 & W5C5 & -W5C1 & W5C7 & W5C3 \\ W6C6 & -W6C6 & W6C6 & -W6C6 & 0 & 0 & 0 & 0 \\ 0 & 0 & 0 & 0 & W7C7 & -W7C5 & W7C3 & -W7C1 \end{bmatrix}}_{24} \begin{bmatrix} A0 \\ A1 \\ A2 \\ A3 \\ A4 \\ A5 \\ A6 \\ A7 \end{bmatrix}$$

Fig. 3

$$\begin{bmatrix} Y0 \\ Y1 \\ Y2 \\ Y3 \\ Y4 \\ Y5 \\ Y6 \\ Y7 \end{bmatrix} = \frac{1}{2} \begin{bmatrix} C4 & C4 & C4 & C4 & C4 & C4 & C4 & C4 \\ C1 & C3 & C5 & C7 & -C7 & -C5 & -C3 & -C1 \\ C2 & C6 & -C6 & -C2 & -C2 & -C6 & C6 & C2 \\ C3 & -C7 & -C1 & -C5 & C5 & C1 & C7 & -C3 \\ C4 & -C4 & -C4 & C4 & C4 & -C4 & -C4 & C4 \\ C5 & -C1 & C7 & C3 & -C3 & -C7 & C1 & -C5 \\ C6 & -C2 & C2 & -C6 & -C6 & C2 & -C2 & C6 \\ C7 & -C5 & C3 & -C1 & C1 & -C3 & C5 & -C7 \end{bmatrix} \begin{bmatrix} X0 \\ X1 \\ X2 \\ X3 \\ X4 \\ X5 \\ X6 \\ X7 \end{bmatrix}$$

$\}\ 21$ $Ci = \cos(i\pi/16)$
$i = 1, 2, \cdots, 7$

Fig. 4

$$\begin{bmatrix} Y_0 \\ Y_1 \\ Y_2 \\ Y_3 \\ Y_4 \\ Y_5 \\ Y_6 \\ Y_7 \end{bmatrix} = \frac{1}{2} \underbrace{\begin{bmatrix} C_4 & C_4 & C_4 & C_4 & 0 & 0 & 0 & 0 \\ 0 & 0 & 0 & 0 & C_1 & C_3 & C_5 & C_7 \\ C_2 & C_6 & -C_6 & -C_2 & 0 & 0 & 0 & 0 \\ 0 & 0 & 0 & 0 & C_3 & -C_7 & -C_1 & -C_5 \\ C_4 & -C_4 & -C_4 & C_4 & 0 & 0 & 0 & 0 \\ 0 & 0 & 0 & 0 & C_5 & -C_1 & C_7 & C_3 \\ C_6 & -C_2 & C_2 & -C_6 & 0 & 0 & 0 & 0 \\ 0 & 0 & 0 & 0 & C_7 & -C_5 & C_3 & -C_1 \end{bmatrix}}_{23} \underbrace{\begin{bmatrix} A_0 \\ A_1 \\ A_2 \\ A_3 \\ A_4 \\ A_5 \\ A_6 \\ A_7 \end{bmatrix}}_{22}$$

$A_0 = X_0 + X_7, \quad A_4 = X_0 - X_7$
$A_1 = X_1 + X_6, \quad A_5 = X_1 - X_6$
$A_2 = X_2 + X_5, \quad A_6 = X_2 - X_5$
$A_3 = X_3 + X_4, \quad A_7 = X_3 - X_4$

Fig. 5

$$\begin{bmatrix} Y_0' \\ Y_1' \\ Y_2' \\ Y_3' \\ Y_4' \\ Y_5' \\ Y_6' \\ Y_7' \end{bmatrix} = \begin{bmatrix} W_0Y_0 \\ W_1Y_1 \\ W_2Y_2 \\ W_3Y_3 \\ W_4Y_4 \\ W_5Y_5 \\ W_6Y_6 \\ W_7Y_7 \end{bmatrix} = \frac{1}{2} \underbrace{\begin{bmatrix} W_0C_4 & W_0C_4 & W_0C_4 & W_0C_4 & 0 & 0 & 0 & 0 \\ 0 & 0 & 0 & 0 & W_1C_1 & W_1C_3 & W_1C_5 & W_1C_7 \\ W_2C_2 & W_2C_6 & -W_2C_6 & -W_2C_2 & 0 & 0 & 0 & 0 \\ 0 & 0 & 0 & 0 & W_3C_3 & -W_3C_7 & -W_3C_1 & -W_3C_5 \\ W_4C_4 & -W_4C_4 & -W_4C_4 & W_4C_4 & 0 & 0 & 0 & 0 \\ 0 & 0 & 0 & 0 & W_5C_5 & -W_5C_1 & W_5C_7 & W_5C_3 \\ W_6C_6 & -W_6C_6 & W_6C_6 & -W_6C_6 & 0 & 0 & 0 & 0 \\ 0 & 0 & 0 & 0 & W_7C_7 & -W_7C_5 & W_7C_3 & -W_7C_1 \end{bmatrix}}_{24} \begin{bmatrix} A_0 \\ A_1 \\ A_2 \\ A_3 \\ A_4 \\ A_5 \\ A_6 \\ A_7 \end{bmatrix}$$

Fig. 8

$$\begin{bmatrix} V0 \\ V1 \\ V2 \\ V3 \\ V4 \\ V5 \\ V6 \\ V7 \end{bmatrix} = \frac{1}{2} \begin{bmatrix} C4 & C1 & C2 & C3 & C4 & C5 & C6 & C7 \\ C4 & C3 & C6 & -C7 & -C4 & -C1 & -C2 & -C5 \\ C4 & C5 & -C6 & -C1 & -C4 & C7 & C2 & C3 \\ C4 & C7 & -C2 & -C5 & C4 & C3 & -C6 & -C1 \\ C4 & -C7 & -C2 & C5 & C4 & -C3 & -C6 & C1 \\ C4 & -C5 & -C6 & C1 & -C4 & -C7 & C2 & -C3 \\ C4 & -C3 & C6 & C7 & -C4 & C1 & -C2 & C5 \\ C4 & -C1 & C2 & -C3 & C4 & -C5 & C6 & -C7 \end{bmatrix} \begin{bmatrix} U0 \\ U1 \\ U2 \\ U3 \\ U4 \\ U5 \\ U6 \\ U7 \end{bmatrix}$$

$$\begin{bmatrix} V0 \\ V1 \\ V2 \\ V3 \\ V4 \\ V5 \\ V6 \\ V7 \end{bmatrix} = \frac{1}{2} \begin{Bmatrix} C4 & 0 & C2 & 0 & C4 & 0 & C6 & 0 \\ C4 & 0 & C6 & 0 & -C4 & 0 & -C2 & 0 \\ C4 & 0 & -C6 & 0 & -C4 & 0 & C2 & 0 \\ C4 & 0 & -C2 & 0 & C4 & 0 & -C6 & 0 \\ 0 & C1 & 0 & C3 & 0 & C5 & 0 & C7 \\ 0 & C3 & 0 & -C7 & 0 & -C1 & 0 & -C5 \\ 0 & C5 & 0 & -C1 & 0 & C7 & 0 & C3 \\ 0 & C7 & 0 & -C5 & 0 & C3 & 0 & -C1 \end{Bmatrix} \begin{Bmatrix} U0=B0+B4, & U7=B0-B4 \\ U1=B1+B5, & U6=B1-B5 \\ U2=B2+B6, & U5=B2-B6 \\ U3=B3+B7, & U4=B3-B7 \end{Bmatrix}$$

$$\begin{bmatrix} B0 \\ B1 \\ B2 \\ B3 \\ B4 \\ B5 \\ B6 \\ B7 \end{bmatrix} = \frac{1}{2} \begin{bmatrix} C4 & 0 & C2 & 0 & C4 & 0 & C6 & 0 \\ C4 & 0 & C6 & 0 & -C4 & 0 & -C2 & 0 \\ C4 & 0 & -C6 & 0 & -C4 & 0 & C2 & 0 \\ C4 & 0 & -C2 & 0 & C4 & 0 & -C6 & 0 \\ 0 & C1 & 0 & C3 & 0 & C5 & 0 & C7 \\ 0 & C3 & 0 & -C7 & 0 & -C1 & 0 & -C5 \\ 0 & C5 & 0 & -C1 & 0 & C7 & 0 & C3 \\ 0 & C7 & 0 & -C5 & 0 & C3 & 0 & -C1 \end{bmatrix} \begin{bmatrix} V0'/W0 \\ V1'/W1 \\ V2'/W2 \\ V3'/W3 \\ V4'/W4 \\ V5'/W5 \\ V6'/W6 \\ V7'/W7 \end{bmatrix}$$

$$= \frac{1}{2} \underbrace{\begin{bmatrix} C4/W0 & 0 & C2/W2 & 0 & C4/W4 & 0 & C6/W6 & 0 \\ C4/W0 & 0 & C6/W2 & 0 & -C4/W4 & 0 & -C2/W6 & 0 \\ C4/W0 & 0 & -C6/W2 & 0 & -C4/W4 & 0 & C2/W6 & 0 \\ C4/W0 & 0 & -C2/W2 & 0 & C4/W4 & 0 & -C6/W6 & 0 \\ 0 & C1/W1 & 0 & C3/W3 & 0 & C5/W5 & 0 & C7/W7 \\ 0 & C3/W1 & 0 & -C7/W3 & 0 & -C1/W5 & 0 & -C5/W7 \\ 0 & C5/W1 & 0 & -C1/W3 & 0 & C7/W5 & 0 & C3/W7 \\ 0 & C7/W1 & 0 & -C5/W3 & 0 & C3/W5 & 0 & -C1/W7 \end{bmatrix}}_{44} \begin{bmatrix} V0' \\ V1' \\ V2' \\ V3' \\ V4' \\ V5' \\ V6' \\ V7' \end{bmatrix}$$

Fig. 13

$$Y = \begin{bmatrix} Y0 \\ Y1 \\ Y2 \\ Y3 \\ Y4 \\ Y5 \\ Y6 \\ Y7 \end{bmatrix} = \frac{1}{2} \underbrace{\begin{bmatrix} C4 & C4 & 0 & 0 & 0 & 0 & 0 & 0 \\ 0 & 0 & 0 & 0 & C1 & C3 & C5 & C7 \\ 0 & 0 & C2 & C6 & 0 & 0 & 0 & 0 \\ 0 & 0 & 0 & 0 & C3 & -C7 & -C1 & -C5 \\ C4 & -C4 & 0 & 0 & 0 & 0 & 0 & 0 \\ 0 & 0 & 0 & 0 & C5 & -C1 & C7 & C3 \\ 0 & 0 & C6 & -C2 & 0 & 0 & 0 & 0 \\ 0 & 0 & 0 & 0 & C7 & -C5 & C3 & -C1 \end{bmatrix}}_{72} \underbrace{\begin{bmatrix} P0 \\ P1 \\ P2 \\ P3 \\ A4 \\ A5 \\ A6 \\ A7 \end{bmatrix}}_{71}$$

$$
\begin{bmatrix} V0 \\ V1 \\ V2 \\ V3 \\ V4 \\ V5 \\ V6 \\ V7 \end{bmatrix}
=
\frac{1}{2}
\underbrace{\begin{bmatrix}
C4 & 0  & 0  & 0  & C4 & 0  & 0  & 0 \\
C4 & 0  & 0  & 0  & -C4& 0  & 0  & 0 \\
0  & 0  & C2 & 0  & 0  & 0  & C6 & 0 \\
0  & 0  & C6 & 0  & 0  & 0  & -C2& 0 \\
0  & C1 & 0  & C3 & 0  & C5 & 0  & C7 \\
0  & C3 & 0  & -C7& 0  & -C1& 0  & -C5\\
0  & C5 & 0  & -C1& 0  & C7 & 0  & C3 \\
0  & C7 & 0  & -C5& 0  & C3 & 0  & -C1
\end{bmatrix}}_{101}
\underbrace{\begin{bmatrix} Q0 \\ Q1 \\ Q2 \\ Q3 \\ B4 \\ B5 \\ B6 \\ B7 \end{bmatrix}}_{102}
$$

B0=Q0+Q2, B3=Q0−Q2
B1=Q1+Q3, B2=Q1−Q3

ORTHOGONAL TRANSFORM PROCESSOR

BACKGROUND OF THE INVENTION

The present invention relates to an orthogonal transform processor suitably used for an image processing, a speech processing, etc.

For example, in a compressing and coding system for image data, a small-size orthogonal transform processor is required for transforming spatial domain signals into frequency domain signals. An encoder adopts a forward orthogonal transform such as a discrete cosine transform (hereinafter referred to as DCT) and a discrete sine transform (hereinafter referred to as DST). A decoder adopts an inverse orthogonal transform such as an inverse discrete cosine transform (hereinafter referred to as IDCT) and an inverse discrete sine transform (hereinafter referred to as IDST).

U.S. Pat. No. 4,791,598 discloses a two-dimensional DCT processor comprising two one-dimensional DCT circuits and a transposition memory interposed therebetween. Each of the one-dimensional DCT circuits adopts a so-called fast algorithm and a distributed arithmetic (DA) method, and comprises a butterfly operation circuit including plural adders and subtracters, and a distributed arithmetic circuit, disposed at the subsequent level, for obtaining vector inner products by using not a multiplier but a ROM (read only memory). The distributed arithmetic circuit includes plural ROM/accumulators (hereinafter referred to as RACs). Each of the RACs includes a ROM for storing, in a form of a look-up table, partial sums of the vector inner products based on a discrete cosine matrix, and an accumulator for obtaining a vector inner product corresponding to an input vector by adding, with the digits aligned, the partial sums successively retrieved from the ROM with bit slice words using as addresses. In a one-dimensional IDCT circuit, a butterfly operation circuit is disposed at a level subsequent to plural RACs included in a distributed arithmetic circuit.

In general, human visual sense is more insensitive to high frequency components than to low frequency components. Therefore, for the purpose of improvement in compression efficiency in a DVC (digital video cassette) and the like, a low frequency component in the one-dimensional DCT result is multiplied by a large weighting and a high frequency component is multiplied by a small weighting before coding. However, multiplication for such frequency-depending weighting of the one-dimensional DCT result requires an additional multiplier. U.S. Pat. No. 5,117,381 describes a one-dimensional eight-point DCT circuit for limited weighting. In this circuit, a multiplier for executing multiplication of input data by elements of a discrete cosine matrix is used also for giving the weighting.

The one-dimensional DCT circuit disclosed in U.S. Pat. No. 5,117,381 is disadvantageously limited to application to the eight-point DCT and cannot be applied to arbitrary weighting. Also, this one-dimensional DCT circuit has a problem that the circuit scale and power consumption are larger, owing to the usage of the multiplier, than those of the one-dimensional DCT circuit described in U.S. Pat. No. 4,791,598.

Furthermore, in dealing with an input data matrix comprising N×N elements in the two-dimensional DCT processor disclosed in U.S. Pat. No. 4,791,598, each of the two one-dimensional DCT circuits executes N-point one-dimensional DCT. In this case, each of the two one-dimensional DCT circuits includes N RACs. Specifically, this two-dimensional DCT processor requires to include 2N RACs in total, which disadvantageously increases the circuit scale and power consumption.

SUMMARY OF THE INVENTION

One object of this invention is providing an orthogonal transform processor which can give arbitrary weighting to the transform result without using any multiplier.

Another object is reducing the number of RACs included in a two-dimensional DCT processor.

According to the invention, for the purpose of achieving the aforementioned objects, with regard to an orthogonal transform, partial sums of vector inner products based on a constant matrix obtained by multiplying respective elements of an orthogonal transform matrix by frequency-depending weighting, and with regard to an inverse orthogonal transform, partial sums of vector inner products based on a constant matrix obtained by dividing respective elements of an inverse orthogonal transform matrix by frequency-depending weighting are stored in look-up tables in a distributed arithmetic circuit. By using the contents of the look-up tables, the transform with weighting given can be realized. In this invention, the orthogonal transform and weighting are simultaneously executed, and the inverse orthogonal transform and removal of weighting are simultaneously executed. Thus, there is no need to use a multiplier for executing multiplication of input data by the elements of the orthogonal matrix or the inverse orthogonal matrix as a result of adopting the DA method. In addition, there is no need to provide a multiplier for giving weighting and a divider for removing weighting. Moreover, the arbitrary weighting can be given to the transform result without restriction in the kind of transform and the transform point.

Furthermore, according to the invention, for example, two-dimensional DCT of 8×8 elements can be realized by using three one-dimensional DCT circuits each for executing four-point one-dimensional DCT. Specifically, a two-dimensional DCT processor for an input data matrix including N×N elements comprises a first circuit for generating a half of N elements resulting from a first N-point transform by successively executing N/2-point one-dimensional DCT on N input vectors each including N elements; a second circuit for generating a half of N elements resulting from a second N-point transform by successively executing N/2-point one-dimensional DCT on N transposition vectors each including N elements; a third circuit for generating another half of the N elements resulting from the first N-point transform by successively executing another N/2-point one-dimensional DCT on the N input vectors and for generating another half of the N elements resulting from the second N-point transform by successively executing another N/2-point one-dimensional DCT on the N transposition vectors; and a transposition memory for storing the N elements resulting from the first N-point transform generated by the first and third circuits and supplying the N transposition vectors to the second and third circuits, and the N elements resulting from the second N-point transform generated by the second and third circuits are output as a two-dimensional DCT result of the input data matrix. In this processor, the first N-point DCT is executed by the first and third circuits, and the second N-point DCT is executed by the second and third circuits. Each of the first, second and third circuits includes N/2 RACs. Accordingly, the number of the RACs included in the two-dimensional DCT processor can be decreased from 2N to 3N/2. According to the invention, a two-dimensional IDCT processor can be similarly configured.

Each of the first and second circuits includes one butterfly operation circuit, and the third circuit includes two butterfly operation circuits. Each distributed arithmetic circuit in the first, second and third circuits includes N/2 look-up tables. Partial sums each of two bits are retrieved from each look-up table of the first and second circuits, and partial sums each of four bits are retrieved from each look-up table of the third circuit. Thus, the processing speed of the third circuit can be twice as high as that of the first and second circuits. In this manner, the third circuit can be operated on a time-sharing basis.

BRIEF DESCRIPTION OF THE DRAWINGS

FIG. 3 illustrates a fundamental discrete cosine matrix;

FIG. 4 illustrates a discrete cosine matrix used in adopting butterfly operation;

FIG. 5 illustrates a constant matrix with weighting given for use in the one-dimensional DCT circuit of FIG. 1;

FIG. 8 illustrates a fundamental inverse discrete cosine matrix;

FIG. 9 illustrates an inverse discrete cosine matrix used in adopting the butterfly operation;

FIG. 10 illustrates a constant matrix with weighting given for use in the one-dimensional IDCT circuit of FIG. 6;

FIG. 13 illustrates a discrete cosine matrix used in adopting two-level butterfly operation;

FIG. 15 illustrates an inverse cosine matrix used in adopting the two-level butterfly operation.

DETAILED DESCRIPTION OF THE INVENTION

Specific embodiments of an orthogonal transform processor and an inverse orthogonal transform processor of this invention will now be described with reference to the accompanying drawings.

Figure 1:
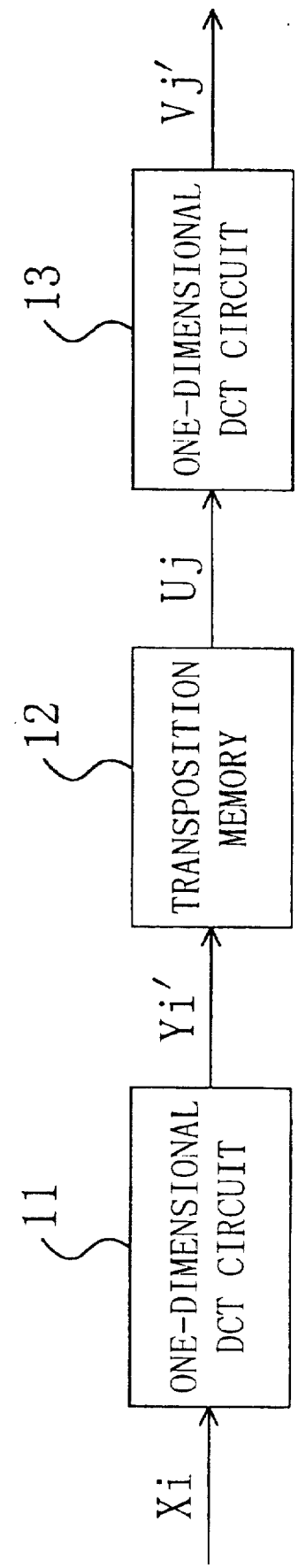
FIG. 1 is a block diagram for showing an exemplified configuration of a two-dimensional DCT processor according to the invention.
Figure 2:
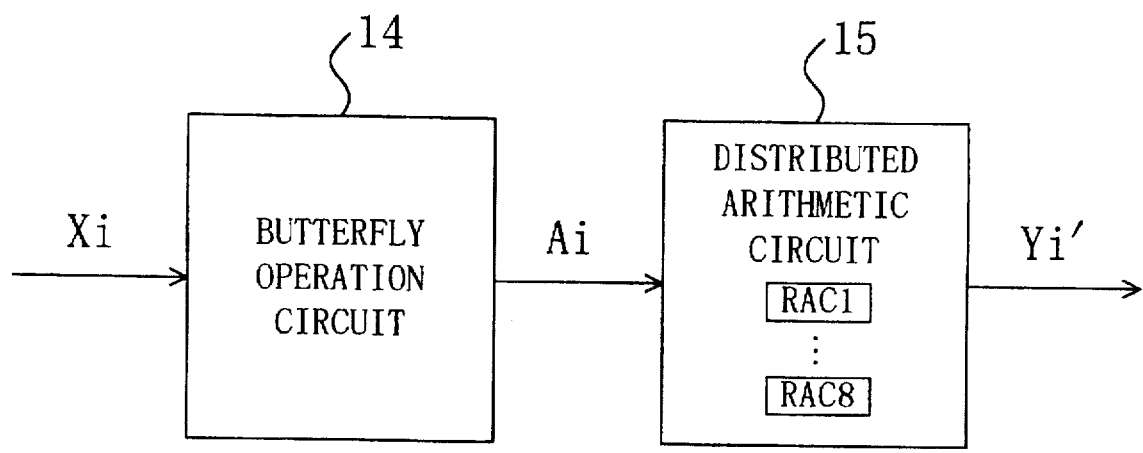
FIG. 2 is a block diagram for showing an exemplified inside configuration of a one-dimensional DCT circuit of FIG. 1.

FIG. 1 shows an exemplified configuration of a two-dimensional DCT processor of this invention. This two-dimensional DCT processor comprises a first one-dimensional DCT circuit 11, a transposition memory 12 and a second one-dimensional DCT circuit 13. The first one-dimensional DCT circuit 11 includes, as is shown in FIG. 2, a butterfly operation circuit 14 and a distributed arithmetic circuit 15 at the subsequent level. Partial sums of vector inner products on the basis of a constant matrix, which is obtained by multiplying respective elements of a discrete cosine matrix in 8 rows and 8 columns by frequency-depending weighting, are stored in eight ROMs included in the distributed arithmetic circuit 15. On the basis of eight elements Xi (wherein i=0, 1, . . . , and 7) included in an input vector, eight elements Yi' corresponding to a part of the one-dimensional DCT result with one-dimensional weighting given are obtained by using the contents of the eight ROMs. These elements Yi' with weighting given are stored in the transposition memory 12 as row vectors. When eight row vectors are completed to be contained in the transposition memory 12, column vectors are started to be read from the transposition memory 12, and the read column vectors are supplied to the second one-dimensional DCT circuit 13 as eight elements Uj (wherein j=0, 1, . . . , and 7) included in an input vector. The second one-dimensional DCT circuit 13 obtains, similarly to the first one-dimensional DCT circuit 11, eight elements Vj' corresponding to a part of the two-dimensional DCT result with two-dimensional weighting given, on the basis of the supplied eight elements Uj. These elements Vj' with weighting given are output by the two-dimensional DCT processor of FIG. 1 as eight elements corresponding to a column vector of the two-dimensional DCT result with weighting given. The entire two-dimensional DCT result with weighting given includes eight column vectors. It is noted that the row vectors and the column vectors can be dealt with in the reverse order.

FIG. 3 illustrates a fundamental discrete cosine matrix. In FIG. 3, a discrete cosine matrix 21 in 8 rows and 8 columns is multiplied by an input vector comprising eight elements Xi (wherein i=0, 1, . . . , and 7), thereby obtaining eight elements Yi corresponding to a part of the one-dimensional DCT result without weighting. At this point, each element of the discrete cosine matrix 21 is defined as:

Ci=cos (iπ/16), wherein i=1, 2, . . . , and 7

FIG. 4 illustrates a discrete cosine matrix used in adopting butterfly operation. In FIG. 4, an input vector comprising eight elements Xi (wherein i=0, 1, . . . , and 7) is transformed into an intermediate vector comprising eight elements Ai through butterfly operation formulas 22. Then, a discrete cosine matrix 23 in 8 rows and 8 columns is multiplied by the intermediate vector comprising the eight elements Ai (wherein i=0, 1, . . . , and 7), thereby obtaining eight elements Yi corresponding to a part of the one-dimensional DCT result without weighting. This multiplication is executed by the distributed arithmetic circuit without using a multiplier. In addition, a half of the entire elements of the discrete cosine matrix 23 of FIG. 4 are 0, and hence, the computation is reduced in FIG. 4 as compared with that in FIG. 3. This allows the distributed arithmetic circuit to adopt a ROM with a smaller capacity.

FIG. 5 illustrates a constant matrix with weighting given for use in the first one-dimensional DCT circuit 11 of FIG. 1. In this case, eight frequency-depending weightings Wi (wherein i=0, 1, . . . , and 7) are introduced. For example, W0=1.00, W1=0.98, W2=0.95, W3=0.90, W4=0.85, W5=0.80, W6=0.75 and W7=0.70. The relationship between eight elements Yi' with weighting resulting from the one-dimensional DCT and the eight elements Yi without weighting is expressed as follows:

Yi'=WiYi, wherein i=0, 1, . . . , and 7

Accordingly, as is shown in FIG. 5, a constant matrix 24, obtained by multiplying the respective elements of the discrete cosine matrix 23 of FIG. 4 by the corresponding weightings. is multiplied by the intermediate vector (obtained by the butterfly operation circuit 14) comprising the eight elements Ai (wherein i=0, 1, ..., and 7), thereby obtaining the eight elements Yi' corresponding to a part of the one-dimensional DCT result with weighting given. This multiplication is executed by the distributed arithmetic circuit 15 without using a multiplier. In addition, a half of the entire elements of the constant matrix 24 with weighting of FIG. 5 are 0, and therefore, the distributed arithmetic circuit 15 can adopt a ROM with a small capacity. Also in the second one-dimensional DCT circuit 13 of FIG. 1, a matrix similar to the constant matrix 24 with weighting of FIG. 5 is used.

Figure 6:
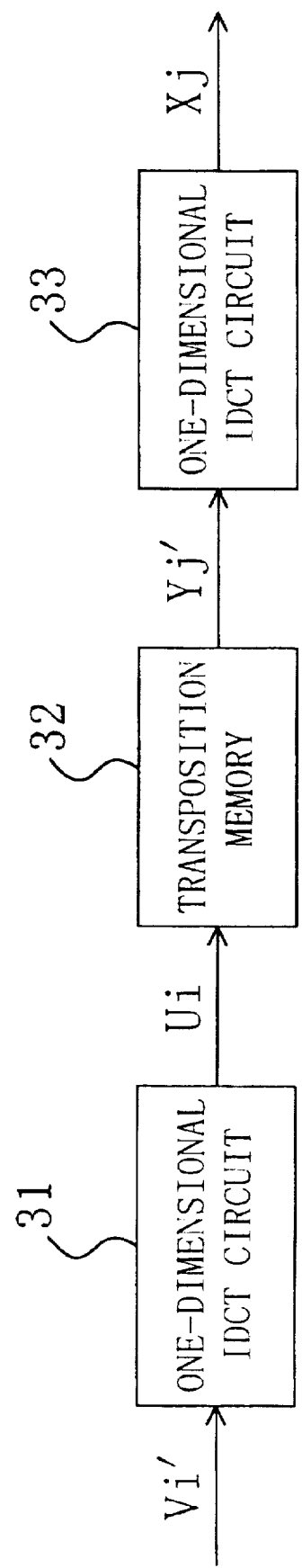
FIG. 6 is a block diagram for showing an exemplified configuration of a two-dimensional IDCT processor according to the invention.
Figure 7:
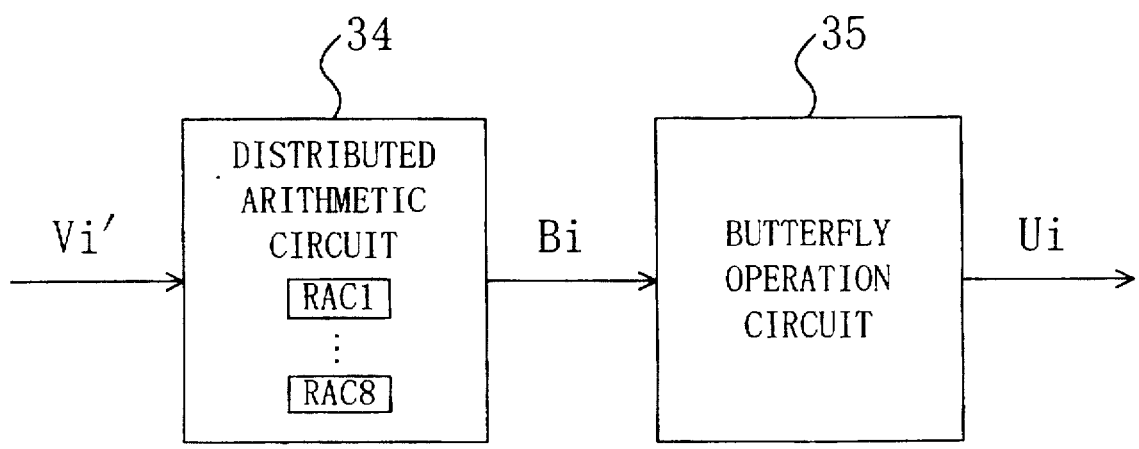
FIG. 7 is a block diagram for showing an exemplified inside configuration of a one-dimensional IDCT circuit of FIG. 6.

FIG. 6 shows an exemplified configuration of a two-dimensional IDCT processor according to the invention. This two-dimensional IDCT processor comprises a first one-dimensional IDCT circuit 31, a transposition memory 32, and a second one-dimensional IDCT circuit 33. The first one-dimensional IDCT circuit 31 comprises, as is shown in FIG. 7, a distributed arithmetic circuit 34 and a butterfly operation circuit 35 at the subsequent level. Partial sums of vector inner products on the basis of a constant matrix, which is obtained by dividing elements of an inverse discrete cosine matrix in 8 rows and 8 columns by frequency-depending weightings, are stored in eight ROMs in the distributed arithmetic circuit 34. On the basis of eight elements Vi' (wherein i=0, 1, ..., and 7) with weighting included in an input vector, eight elements Ui corresponding to a part of the one-dimensional IDCT result with the one-dimensional weighting removed are obtained by using the contents of the eight ROMs. These elements Ui with the one-dimensional weighting removed are stored in the transposition memory 32 as row vectors. When eight row vectors are completed to be stored in the transposition memory 32, column vectors are started to be read from the transposition memory 32, and the read column vectors are supplied to the second one-dimensional IDCT circuit 33 as eight elements Yj' (wherein j=0, 1, ..., and 7) with weighting included in an input vector. The second one-dimensional IDCT circuit 33 obtains, similarly to the first one-dimensional IDCT circuit 31, eight elements Xj corresponding to a part of the two-dimensional IDCT result with the two-dimensional weighting removed, on the basis of the supplied eight elements Yj' with weighting. These elements Xj with two-dimensional weighting removed are output by the two-dimensional IDCT processor of FIG. 6 as eight elements corresponding to a column vector of the IDCT result with the two-dimensional weighting removed. The entire two-dimensional IDCT result having been completely unweighted includes eight column vectors. It is noted that the row vectors and the column vectors can be dealt with in the reverse order.

FIG. 8 illustrates a fundamental inverse discrete cosine matrix. In FIG. 8, an inverse discrete cosine matrix 41 in 8 rows and 8 columns is multiplied by an input vector comprising eight elements Vi (wherein i=0, 1, ..., and 7), thereby obtaining the eight elements Ui corresponding to a part of the one-dimensional IDCT result without weighting.

FIG. 9 illustrates an inverse discrete cosine matrix used in adopting the butterfly operation. In FIG. 9, an inverse discrete cosine matrix 42 in 8 rows and 8 columns is multiplied by an input vector comprising eight elements Vi (wherein i=0, 1, ..., and 7) without weighting, thereby obtaining eight elements Bi included in an intermediate vector. This multiplication is executed by the distributed arithmetic circuit without using a multiplier. The intermediate vector including the eight elements Bi (wherein i=0, 1, ..., and 7) is transformed into a desired vector corresponding to a part of the one-dimensional IDCT result including the eight elements Ui through butterfly operation formulas 43. In addition, a half of the entire elements of the inverse discrete cosine matrix 42 of FIG. 9 are 0, and hence, the computation is reduced in FIG. 9 as compared with that in FIG. 8. This allows the distributed arithmetic circuit to adopt a ROM with a smaller capacity.

FIG. 10 illustrates a constant matrix with weighting given for use in the first one-dimensional IDCT circuit 31 of FIG. 6. Eight frequency-depending weightings Wi (wherein i=0, 1, ..., and 7) used in FIG. 10 are the same as those described above with regard to the DCT. The relationship between eight elements Vi without weighting resulting from the one-dimensional IDCT and eight elements Vi' with weighting given is expressed as follows:

Vi=Vi'/ Wi, wherein i=0, 1, ... and 7

Accordingly, as is shown in FIG. 10, a constant matrix 44, obtained by dividing the respective elements of the inverse discrete cosine matrix 42 of FIG. 9 by the corresponding weightings, is multiplied by an input vector comprising the eight elements Vi' (wherein i=0, 1, ..., and 7) with weighting, thereby obtaining the eight elements Bi included in the intermediate vector resulting from the one-dimensional removal of weighting. This multiplication is executed by the distributed arithmetic circuit 34 without using a multiplier. The intermediate vector comprising the eight elements Bi (wherein i=0, 1, ..., and 7) is transformed into a desired vector corresponding to a part of the one-dimensional IDCT result including the eight elements Ui through the butterfly operation formulas 43 in the butterfly operation circuit 35. In addition, a half of the entire elements of the constant matrix 44 with weighting of FIG. 10 are 0, and hence, the distributed arithmetic circuit 34 can adopt a ROM with a smaller capacity. Also the second one-dimensional IDCT circuit 33 of FIG. 6 adopts a matrix similar to the constant matrix 44 with weighting of FIG. 10.

The aforementioned specific embodiments are given on the eight-point DCT and IDCT, but the application of the invention is limited neither by the kind of transform nor by the transform point. Therefore, the invention described so far with reference to FIGS. 1 through 10 is widely applicable to N-point orthogonal and inverse orthogonal transform processors. For example, the invention is applicable also to N-point DST and IDST.

Figure 11:
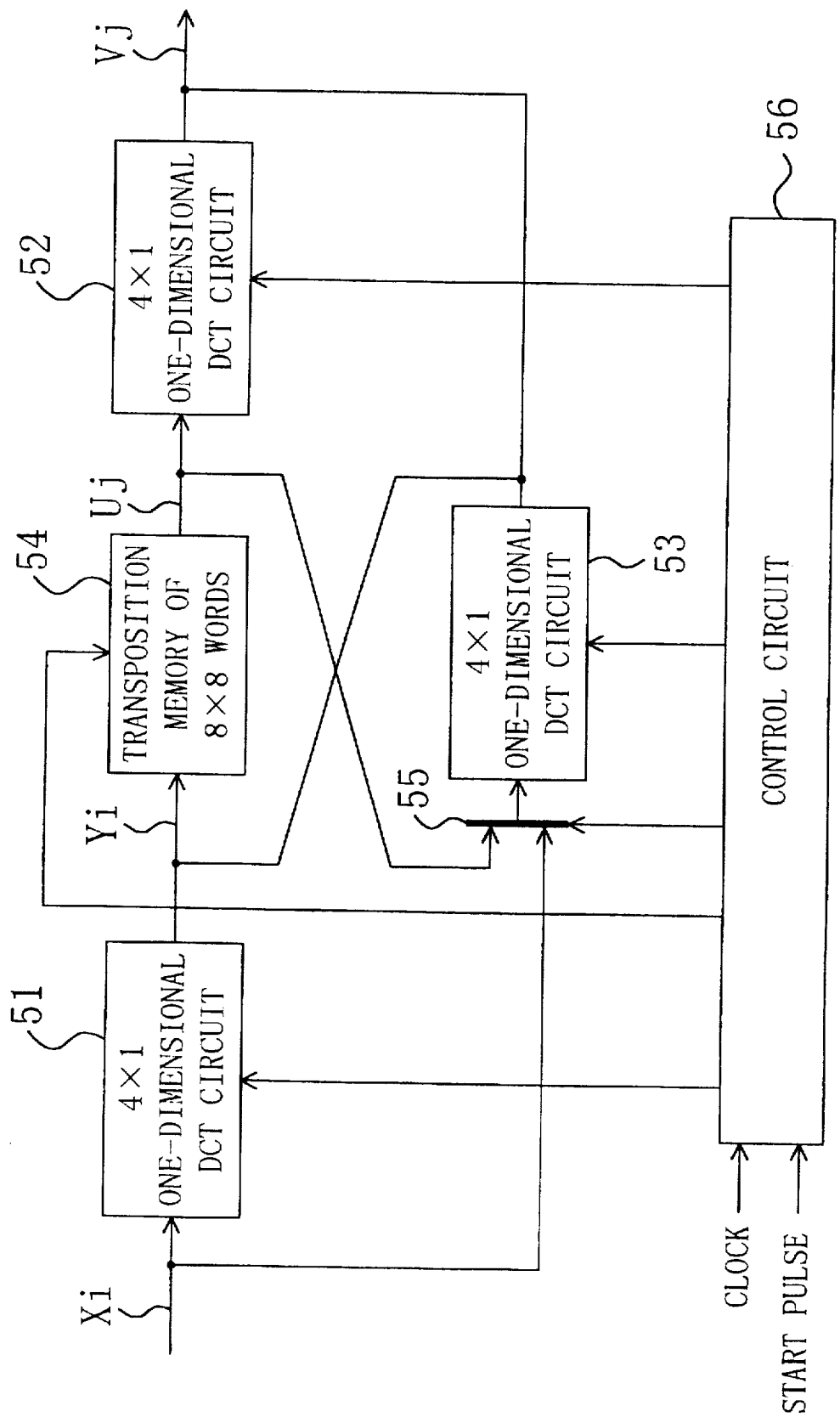
FIG. 11 is a block diagram for showing another exemplified configuration of the two-dimensional DCT processor according to the invention.

FIG. 11 shows another exemplified configuration of the two-dimensional DCT processor of the invention. This two-dimension DCT processor comprises first, second and third one-dimensional DCT circuits 51, 52 and 53 each for executing four-point one-dimensional DCT, a transposition memory 54 of 8×8 words, a multiplexer 55 for switching the input of the third one-dimensional DCT circuit 53, and a control circuit 56 for controlling the operations of these composing elements in response to a start pulse and a clock signal. Each of the first and third one-dimensional DCT circuit 51 and 53 obtains, on the basis of eight elements Xi (wherein i=0, 1, ..., and 7) included in an input vector, eight elements Yi corresponding to a part of the one-dimensional DCT result. These elements Yi are stored in the transposition memory 54 as row vectors. When eight row vectors are completed to be stored in the transposition memory 54, column vectors are started to be read from the transposition memory 54, and the read column vectors (transposition vectors) are supplied to each of the second and third one-dimensional DCT circuits 52 and 53 as eight elements Uj (wherein j=0, 1, ... and 7) included in an input vector. Each of the second and third one-dimensional DCT circuits 52 and 53 obtains, on the basis of the supplied eight elements Uj, eight elements Vj corresponding to a part of the two-dimensional DCT result. These elements Vj are output by the two-dimensional DCT processor of FIG. 11 as eight elements corresponding to a column vector resulting from the two-dimensional DCT. The entire two-dimensional DCT result includes eight column vectors. It is noted that the row vectors and the column vectors can be dealt with in the reverse order.

Figure 12:
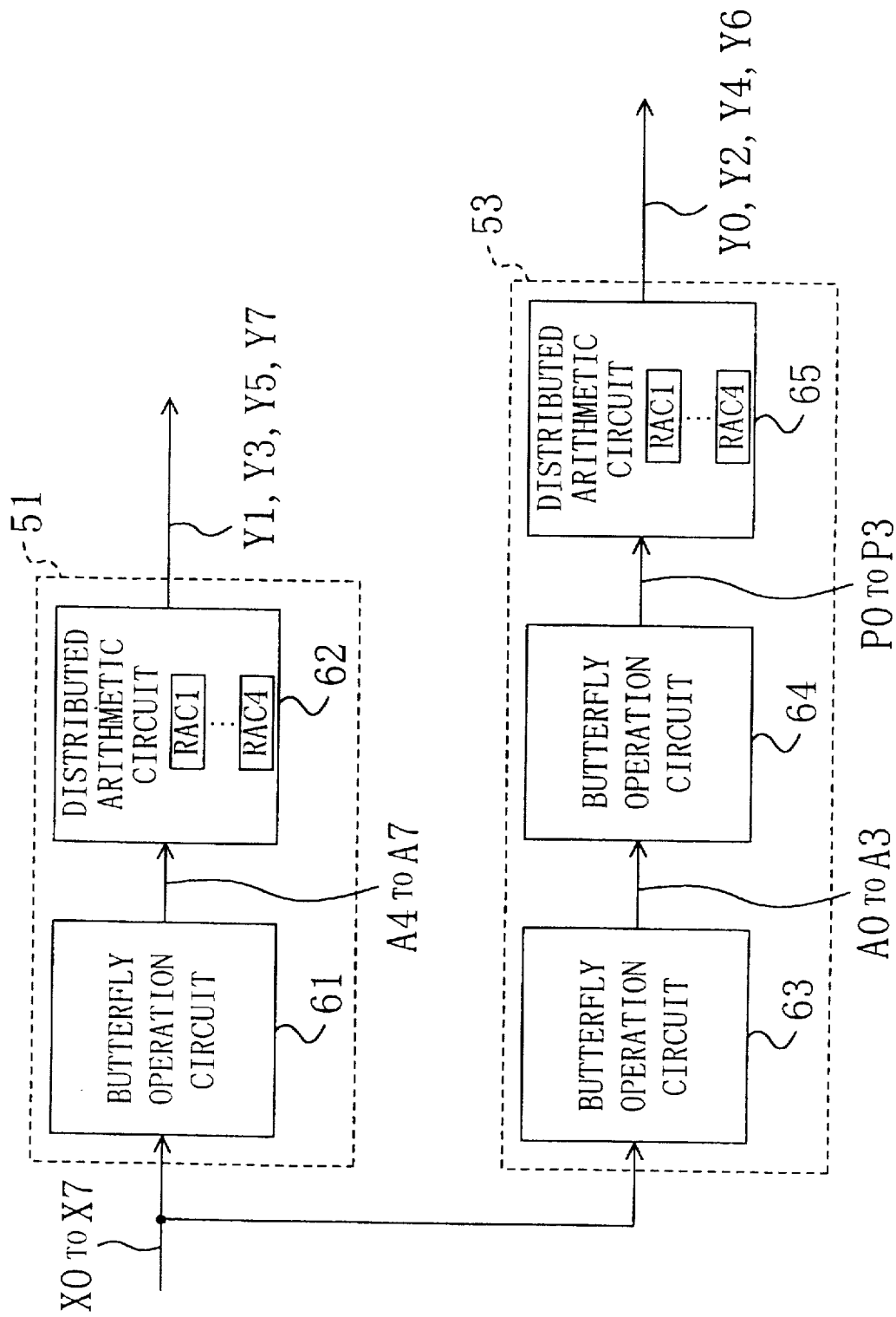
FIG. 12 is a block diagram for showing inside configurations of two one-dimensional DCT circuits of FIG. 11.

FIG. 12 shows the inside configurations and operations of the first and third one-dimensional DCT circuits 51 and 53. The first one-dimensional DCT circuit 51 includes a butterfly operation circuit 61 at one level and a distributed arithmetic circuit 62 having four RACs disposed at the subsequent level. The third one-dimensional DCT circuit 53 includes butterfly operation circuits 63 and 64 at two levels and a distributed arithmetic circuit 65 having four RACs at the subsequent level. The second one-dimensional DCT circuit 52 has the same inside configuration as the first one-dimensional DCT circuit 51.

FIG. 13 illustrates a discrete cosine matrix used in the case where another butterfly operation follows the butterfly operation formulas 22 of FIG. 4. In FIG. 13, a partial vector comprising four elements Ai (wherein i=0, 1, 2 and 3) out of eight elements Ai (wherein i=0, 1, . . . , and 7) of an intermediate vector is transformed into a partial vector comprising four elements Pi (wherein i=0, 1, 2 and 3) through butterfly operation formulas 71. Then, a discrete cosine matrix 72 in 8 rows and 8 columns is multiplied by an intermediate vector comprising eight elements P0, P1, P2, P3, A4, A5, A6 and A7, thereby obtaining eight elements Yi corresponding to a part of the one-dimensional DCT result. This multiplication is executed by the distributed arithmetic circuits 62 and 65 without using a multiplier. In addition, forty elements of the discrete cosine matrix 72 of FIG. 13 are 0, and hence, the computation is reduced in FIG. 13 as compared with that in FIGS. 3 and 4.

In FIGS. 4 and 13, the first one-dimensional DCT circuit 51 of FIG. 11 executes four subtractions among the butterfly operation formulas 22 for obtaining the four elements A4, A5, A6 and A7, and four vector inner product computations for obtaining four elements Y1, Y3, Y5 and Y7. In other words, the first one-dimensional DCT circuit 51 comprises, as is shown in FIG. 12, the butterfly operation circuit 61 at one level and the distributed arithmetic circuit 62 having the four RACs at the subsequent level. Each of the RACs includes a ROM for storing, in the form of a look-up table, partial sums of vector inner products based on four rows including four non-0 elements in the right-half portion of the discrete cosine matrix 72, and an accumulator for obtaining a vector inner product corresponding to a partial vector including the four elements A4, A5, A6 and A7 by adding, with the digits aligned, partial sums each of two bits successively retrieved from the ROM with bit slice words using as addresses.

The third one-dimensional DCT circuit 53 of FIG. 11 executes four additions among the butterfly operation formulas 22 for obtaining the four elements A0, A1, A2 and A3, computation of the second butterfly operation formulas 71 for obtaining the four elements P0, P1, P2 and P3, and four vector inner product computations for obtaining four elements Y0, Y2, Y4 and Y6. In other words, the third one-dimensional DCT circuit 53 includes, as is shown in FIG. 12, the butterfly operation circuits 63 and 64 at the two levels and the distributed arithmetic circuit 65 having the four RACs at the subsequent level. Each of the RACs includes a ROM for storing, in the form of a look-up table, partial sums of vector inner products based on four rows including two non-0 elements in the left-half portion of the discrete cosine matrix 72, and an accumulator for obtaining a vector inner product corresponding to a partial vector including the four elements P0, P1, P2 and P3 by adding, with the digits aligned, partial sums each of four bits successively retrieved from the ROM with bit slice words using as addresses.

The partial sums each of two bits are retrieved from each ROM of the first one-dimensional DCT circuit 51, and the partial sums each of four bits are retrieved from each ROM of the third one-dimensional DCT circuit 53. Accordingly, the third one-dimensional DCT circuit 53 can obtain the four elements Y0, Y2, Y4 and Y6 in a time period half as short as that required of the first one-dimensional DCT circuit 51 to obtain the four elements Y1, Y3, Y5 and Y7. These eight elements Yi (wherein i=0, 1, . . . , and 7) obtained by the first and third one-dimensional DCT circuits 51 and 53 are stored in the transposition memory 54 as row vectors. When eight row vectors are completed to be stored in the transposition memory 54, column vectors are started to be read from the transposition memory 54, and the read column vectors are supplied to the second and third one-dimensional DCT circuits 52 and 53 as eight elements Uj (wherein j=0, 1, . . . , and 7) included in a transposition vector. These eight elements Uj are transformed into eight elements Vj by the second and third one-dimensional DCT circuits 52 and 53 in the same manner as described above with regard to the first and third one-dimensional DCT circuits 51 and 53. The second one-dimensional DCT circuit 52 includes, similarly to the first one-dimensional DCT circuit 51, a butterfly operation circuit at one level and a distributed arithmetic circuit having four RACs at the subsequent level. In addition, the partial sums each of two bits are retrieved from each ROM of the second one-dimensional DCT circuit 52, and the parital sums each of four bits are retrieved from each ROM of the third one-dimensional DCT circuit 53. Accordingly, the third one-dimensional DCT circuit 53 can obtain the four elements V0, V2, V4 and V6 in a time period half as short as that required of the second one-dimensional DCT circuit 52 to obtain the four elements V1, V3, V5 and V7. In other words, the third one-dimensional DCT circuit 53 can be operated on a time-sharing basis with the first and second one-dimensional DCT circuits 51 and 52.

Figure 14:
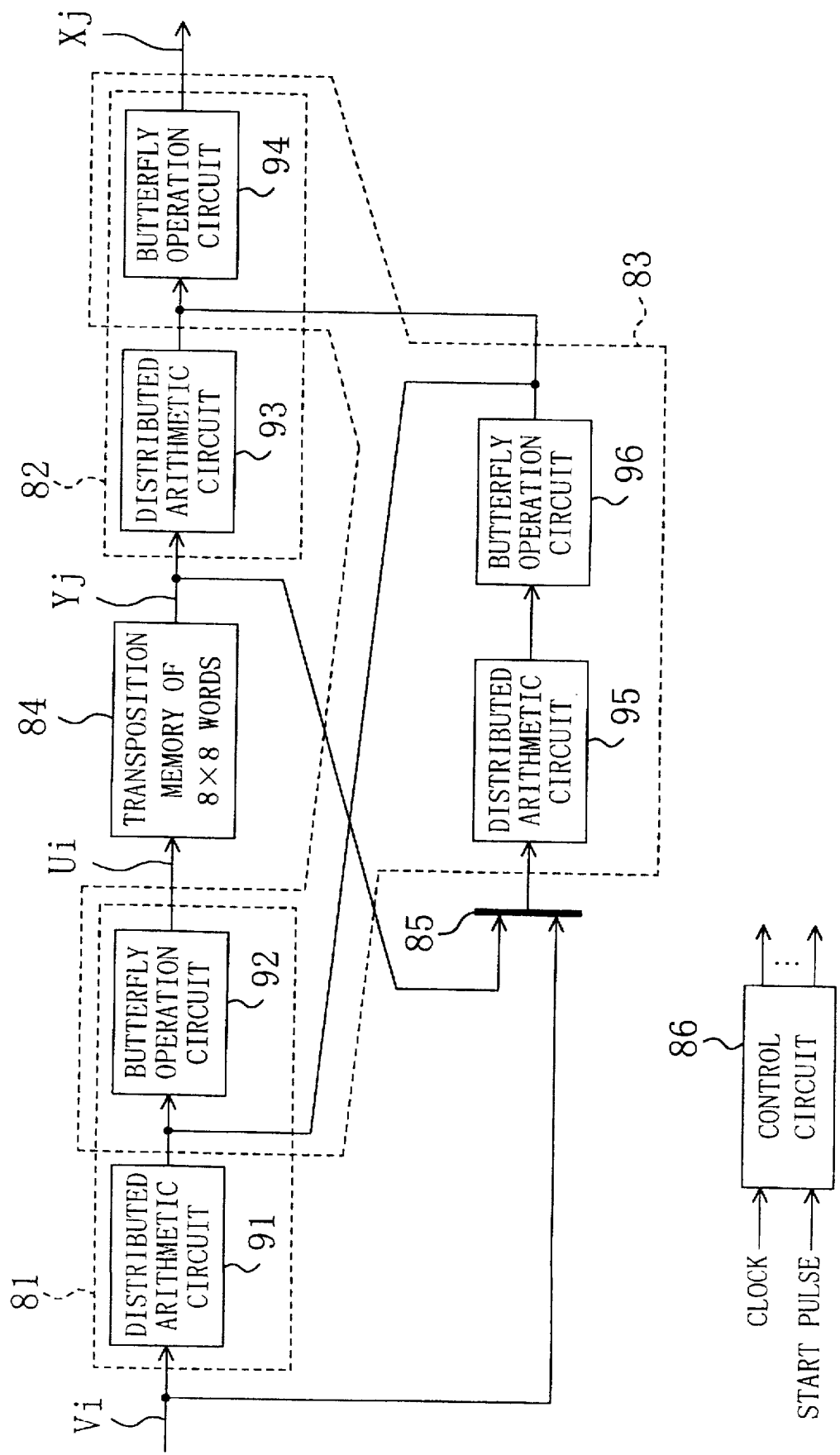
FIG. 14 is a block diagram for showing another exemplified configuration of the two-dimensional IDCT processor according to the invention.

FIG. 14 shows another exemplified configuration of the two-dimensional IDCT processor according to the invention. This two-dimensional IDCT processor comprises first, second and third one-dimensional IDCT circuits 81, 82 and 83 each for executing four-point one-dimensional IDCT, a transposition memory 84 of 8×8 words, a multiplexer 85 for switching the input of the third one-dimensional IDCT circuit 83, and a control circuit 86 for controlling the operations of these composing elements in response to a start pulse and a clock signal. Each of the first and third one-dimensional IDCT circuits 81 and 83 obtains, on the basis of eight elements Vi (wherein i=0, 1, . . . , and 7) included in an input vector, eight elements Ui corresponding to a part of the one-dimensional IDCT result. These elements Ui are stored in the transposition memory 84 as row vectors. When eight row vectors are completed to be stored in the transposition memory 84, column vectors are started to be read from the transposition memory 84, and the read column vectors (transposition vectors) are supplied to each of the second and third one-dimensional IDCT circuits 82 and 83 as eight elements Yj (wherein j=0, 1, . . . , and 7) included in an input vector. Each of the second and third one-dimensional IDCT circuits 82 and 83 obtains eight elements Xj corresponding to a part of the two-dimensional IDCT result, on the basis of the supplied eight elements Yj. These elements Xj are output by the two-dimensional IDCT processor of FIG. 14 as eight elements corresponding to a column vector resulting from the two-dimensional IDCT. The entire two-dimensional IDCT result includes eight column vectors. It is noted that the row vectors and the column vectors can be dealt with in the reverse order.

As is shown in FIG. 14, the first one-dimensional IDCT circuit 81 comprises a distributed arithmetic circuit 91 having four RACs, and a butterfly operation circuit 92 disposed at the subsequent level to the distributed arithmetic circuit 91. The second one-dimensional IDCT circuit 82 comprises a distributed arithmetic circuit 93 having four RACs, and a butterfly operation circuit 94 disposed at the subsequent level to the distributed arithmetic circuit 93. The third one-dimensional IDCT circuit 83 comprises a distributed arithmetic circuit 95 having four RACS, and two butterfly operation circuits 96 and 92 (or 96 and 94) disposed at the subsequent levels to the distributed arithmetic circuit 95. The butterfly operation circuit 92 is shared by the first and third one-dimensional IDCT circuits 81 and 83, and the butterfly operation circuit 94 is shared by the second and third one-dimensional IDCT circuits 82 and 83.

FIG. 15 illustrates an inverse discrete cosine matrix used in the case where another butterfly operation is followed by the butterfly operation formulas 43 of FIG. 9. In FIG. 15, an inverse discrete cosine matrix 101 in 8 rows and 8 columns is multiplied by an input vector comprising eight elements Vi (wherein i=0, 1, . . . , and 7), thereby obtaining an intermediate vector comprising eight elements Q0, Q1, Q2, Q3, B4, B5, B6 and B7. This multiplication is executed by the distributed arithmetic circuits 91 and 95 without using a multiplier. A partial vector of this intermediate vector comprising four elements Qi (wherein i=0, 1, 2 and 3) is transformed into a partial vector comprising four elements Bi (wherein i=0, 1, 2 and 3) through butterfly operation formulas 102 in the butterfly operation circuit 96. An intermediate vector comprising eight elements Bi (wherein i=0, 1, . . . , and 7) is transformed into a desired vector corresponding to a part of the one-dimensional IDCT result comprising eight elements Ui through the butterfly operation formulas 43 in the butterfly operation circuit 92. In this case, forty elements of the inverse descrete cosine matrix 101 of FIG. 15 are 0, and hence, the computation is reduced in FIG. 15 as compared with that in FIGS. 8 and 9.

Figure 16:
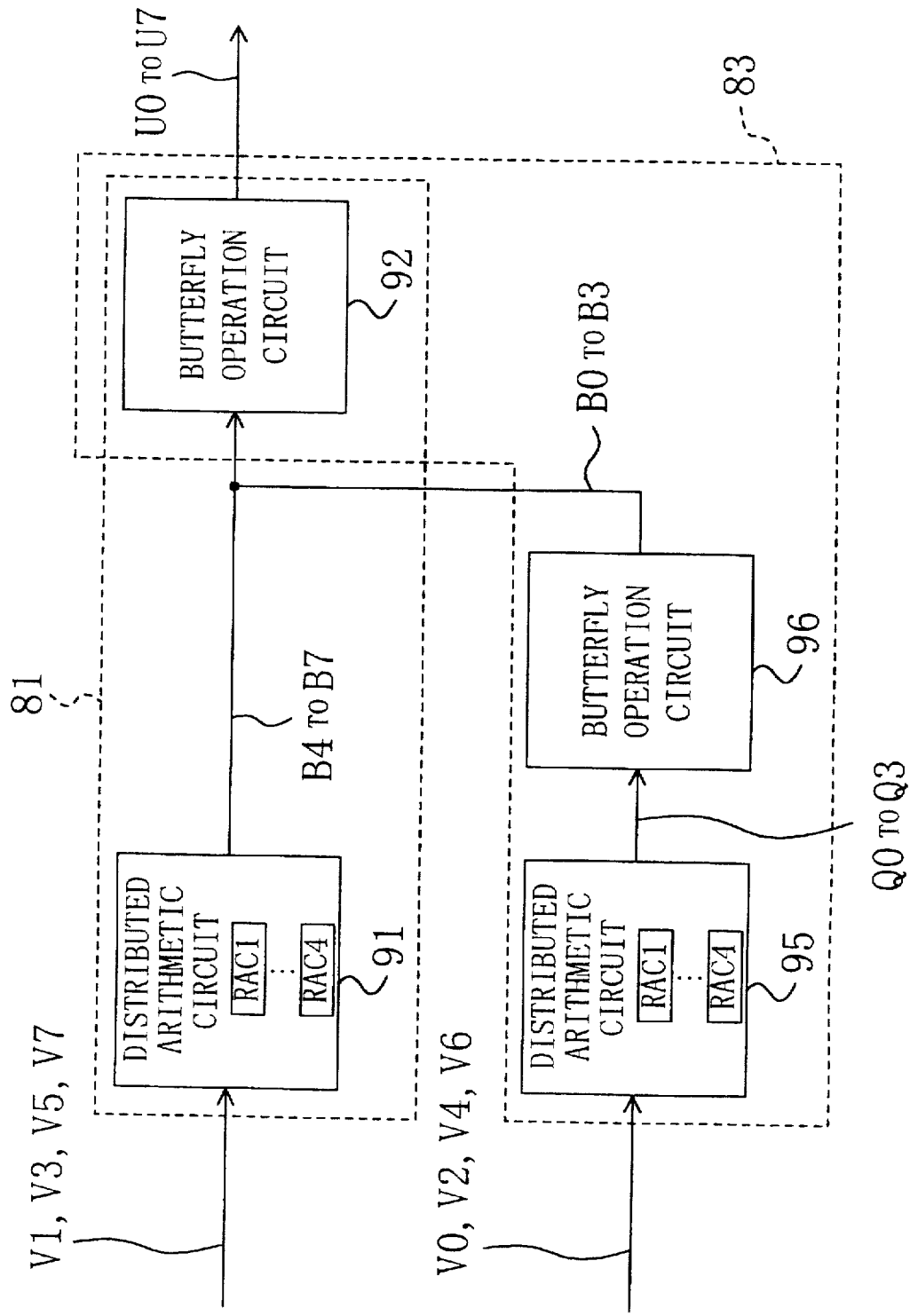
FIG. 16 is a diagram for showing operations of two one-dimensional IDCT circuits of FIG. 14.

FIG. 16 shows the operations of the first and third one-dimensional IDCT circuits 81 and 83. In FIGS. 9 and 15, the first one-dimensional IDCT circuit 81 executes four vector inner product computations for obtaining the four elements B4, B5, B6 and B7 and the computation of the butterfly operation formulas 43. In other words, the first one-dimensional IDCT circuit 81 comprises the distributed arithmetic circuit 91 having the four RACs and the butterfly operation circuit 92 disposed at the subsequent level to the distributed arithmetic circuit 91. The third one-dimensional IDCT circuit 83 executes four vector inner product computations for obtaining the four elements Q0, Q1, Q2 and Q3, computation of the second butterfly operation formulas 102 for obtaining the four elements B0, B1, B2 and B3, and the computation of the butterfly operation formulas 43. In other words, the third one-dimensional IDCT circuit 83 comprises the distributed arithmetic circuit 95 having the four RACs and the two butterfly operation circuits 96 and 92 disposed at the subsequent levels to the distributed arithmetic circuit 95. The butterfly operation circuit 92 is thus shared by the first and third one-dimensional IDCT circuits 81 and 83.

The parital sums each of two bits are retrieved from each ROM of the first one-dimensional IDCT circuit 81, and the partial sums each of four bits are retrieved from each ROM of the third one-dimensional IDCT circuit 83. Accordingly, the third one-dimensional IDCT circuit 83 can obtain the four elements B0, B1, B2 and B3 in a time period half as short as that required of the first one-dimensional IDCT circuit 81 to obtain the four elements B4, B5, B6 and B7. Then, the eight elements Ui (wherein i=0, 1, . . . , and 7) obtained by the first and third one-dimensional IDCT circuits 81 and 83 are stored in the transposition memory 84 as the row vectors. When eight row vectors are completed to be stored in the transposition memory 84, the column vectors are started to be read from the transposition memory 84, and the read column vectors are supplied to each of the second and third one-dimensional IDCT circuits 82 and 83 as eight elements Yj (wherein j=0, 1, . . . , and 7) included in a transposition vector. These eight elements Yj are transformed into eight elements Xj by the second and third one-dimensional IDCT circuits 82 and 83 in the same manner as described above with regard to the first and third one-dimensional IDCT circuits 81 and 83. The second one-dimensional IDCT circuit 82 comprises, similarly to the first one-dimensional IDCT circuit 81, a distributed arithmetic circuit 93 having four RACs and a butterfly operation circuit 94 disposed at the subsequent level to the distributed arithmetic circuit 93. In addition, the parital sums each of two bits are retrieved from each ROM of the second one-dimensional IDCT circuit 82, and the partial sums each of four bits are retrieved from each ROM of the third one-dimensional IDCT circuit 83. Accordingly, the third one-dimensional IDCT circuit 83 can obtain the four elements X0, X1, X2 and X3 in a time period half as short as that required of the second one-dimensional IDCT circuit 82 to obtain the four elements X4, X5, X6 and X7. In other words, the third one-dimensional IDCT circuit 83 can be operated on the time-sharing basis with the first and second one-dimensional IDCT circuits 81 and 82.

The aforementioned specific embodiments are given on the eight-point DCT and IDCT, but the application of the invention is not limited by the transform point, namely, the invention described so far with reference to FIGS. 11 through 16 is widely applicable to N-point DCT and IDCT processors. Furthermore, the ROM in each RAC can be replaced with a random logic circuit having a look-up table function.

What is claimed is:

1. An orthogonal transform processor which stores partial sums of vector inner products based on a constant matrix obtained by multiplying respective elements of an orthogonal transform matrix by frequency-depending weighting, and uses stored contents to obtain an orthogonal transform result with weighting given.

2. A two-dimensional orthogonal transform processor comprising:

two one-dimensional orthogonal transform circuits, each of which stores partial sums of vector inner products based on a constant matrix obtained by multiplying respective elements of an orthogonal transform matrix by frequency-depending weighting and uses stored contents to obtain an orthogonal transform result with weighting given, and a transposition memory interposed between said two one-dimensional orthogonal transform circuits.

3. The two-dimensional orthogonal transform processor of claim 2, wherein each of said two one-dimensional orthogonal transform circuits includes a butterfly operation circuit and a distributed arithmetic circuit.

4. An inverse orthogonal transform processor which stores partial sums of vector inner products based on a constant matrix obtained by dividing respective elements of an inverse orthogonal transform matrix by frequency-depending weighting, and uses stored contents to obtain an inverse orthogonal transform result with weighting removed.

5. A two-dimensional inverse orthogonal transform processor comprising:

two one-dimensional inverse orthogonal transform circuits, each of which stores partial sums of vector inner products based on a constant matrix obtained by dividing respective elements of an inverse orthogonal transform matrix by frequency-depending weighting, and uses stored contents to obtain an inverse orthogonal transform result with weighting removed, and a transposition memory interposed between said two one-dimensional inverse orthogonal transform circuits.

6. The two-dimensional inverse orthogonal transform processor of claim 5, wherein each of said two one-dimensional inverse orthogonal transform circuits includes a distributed arithmetic circuit and a butterfly operation circuit.

* * * * *